United States Patent [19]

Jenkner

[11] Patent Number: 4,829,868
[45] Date of Patent: May 16, 1989

[54] DEVICE FOR ADJUSTING PENETRATION DEPTHS OF A PRESCORING SAW BLADE DURING ADVANCE OF A MOVABLE SAWING UNIT

[76] Inventor: Erwin Jenkner, Lindenstrasse 13, Gechingen, Fed. Rep. of Germany, D-7261

[21] Appl. No.: 194,421

[22] Filed: May 13, 1988

[30] Foreign Application Priority Data

May 14, 1987 [DE] Fed. Rep. of Germany ....... 3716086

[51] Int. Cl.$^4$ .............................................. B27B 5/00
[52] U.S. Cl. ........................................ 83/863; 83/881; 83/886; 83/485
[58] Field of Search ................. 83/863, 879, 880, 862, 83/864, 881, 886, 887, 884, 49, 56, 483, 485, 486, 487, 488, 489, 477.2, 554; 144/136 R, 133 R, 3 R

[56] References Cited

U.S. PATENT DOCUMENTS 4,534,256  8/1985  Benuzzi .................................. 83/863

FOREIGN PATENT DOCUMENTS 2540109  3/1977  Fed. Rep. of Germany ........ 83/863
1232800  5/1971  United Kingdom .................. 83/863

Primary Examiner—Frank T. Yost
Assistant Examiner—Eugenia A. Jones
Attorney, Agent, or Firm—Dick and Harris

[57] ABSTRACT

In a movable sawing unit for severing planar workpiece panels, which has a severing blade and a prescoring saw blade for cutting a prescore groove to prevent splintering of panels by the severing blade, a device for adjusting the depth of penetration of the prescoring saw blade. The prescoring saw blade is operably positioned in advance of the severing blade, upon a vertically movable support. A tactile element associated with the vertically movable support moves along a directing surface extending along the direction of advance of the workpiece panel, causing the prescoring saw blade to occupy a plurality of cutting positions.

5 Claims, 5 Drawing Sheets

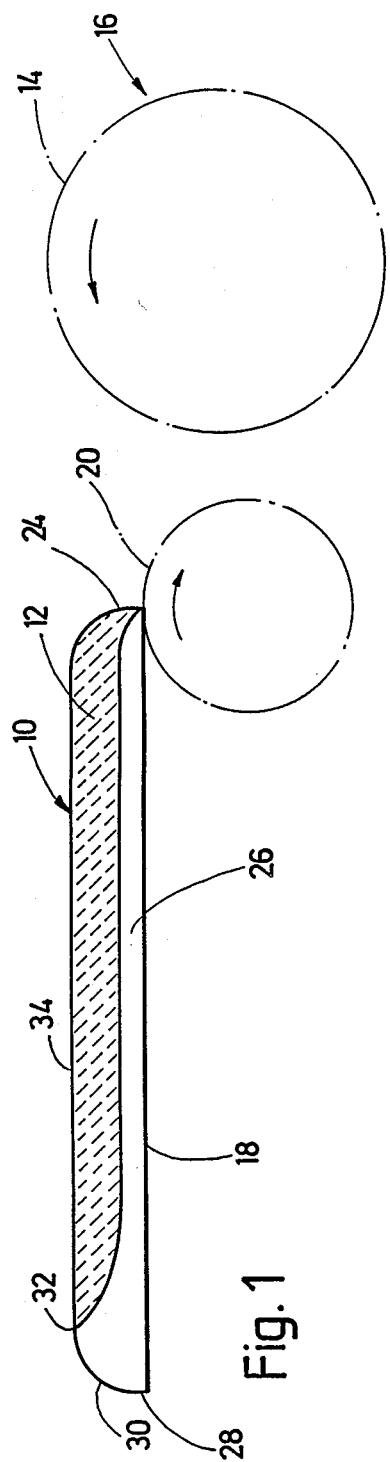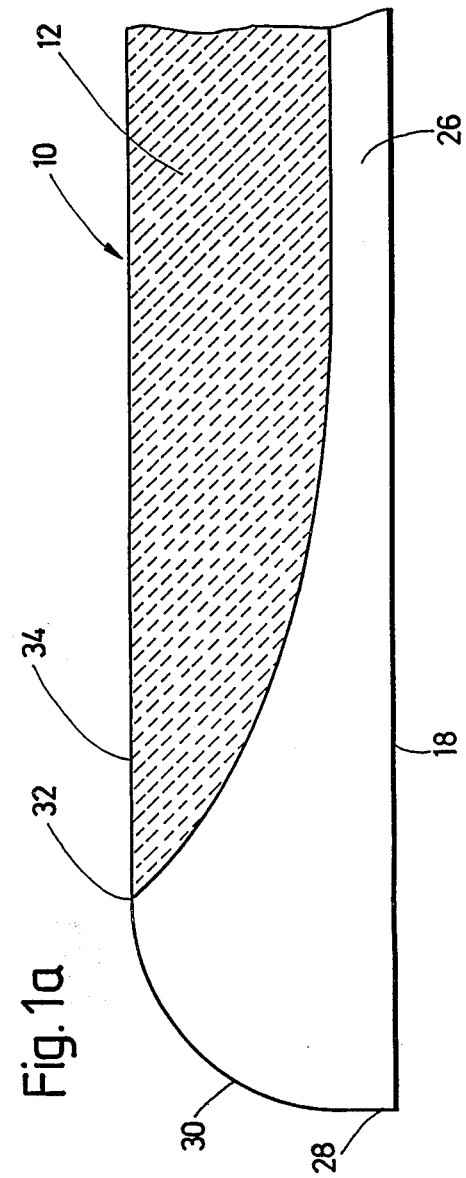
Fig. 1
Fig. 1a

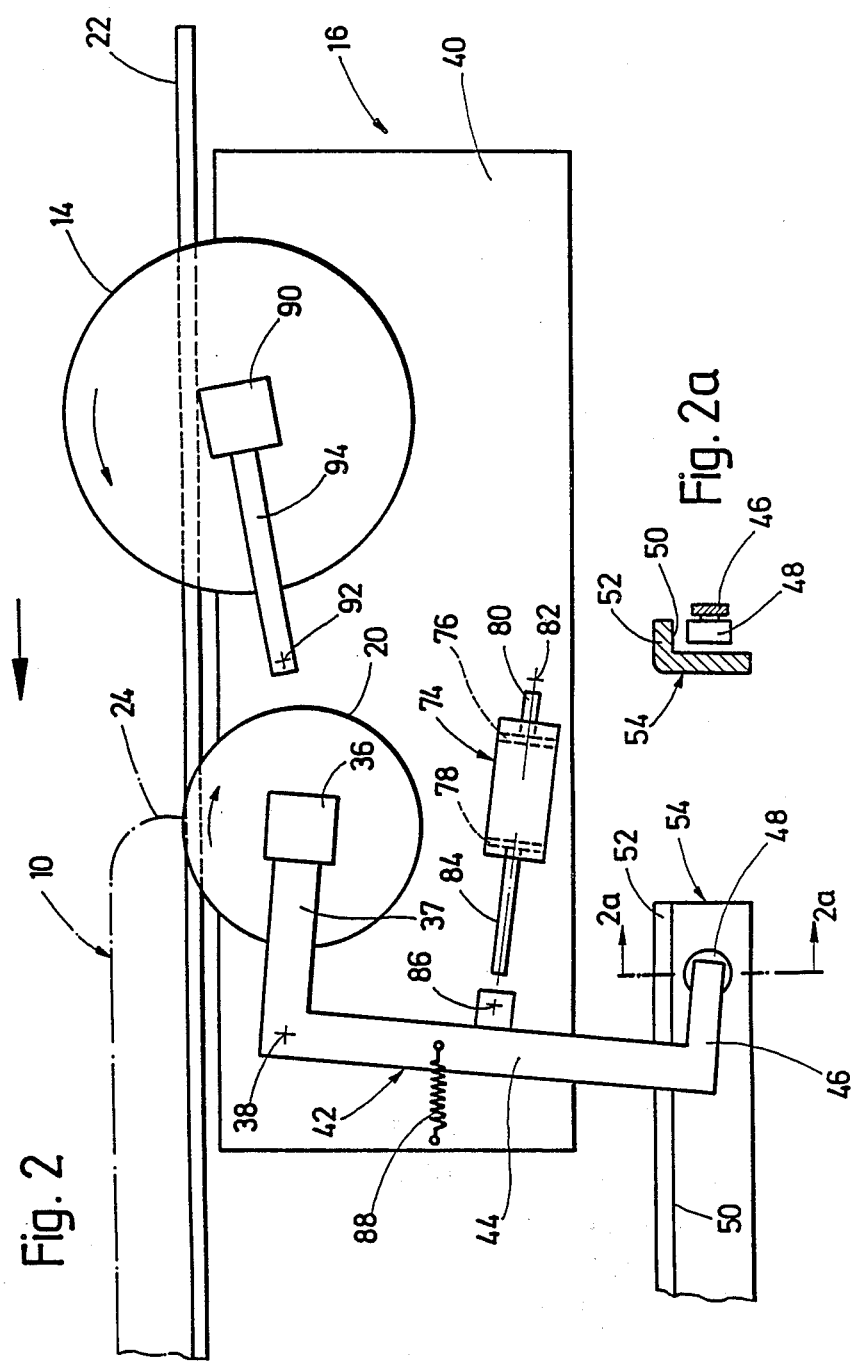

DEVICE FOR ADJUSTING PENETRATION DEPTHS OF A PRESCORING SAW BLADE DURING ADVANCE OF A MOVABLE SAWING UNIT

BACKGROUND OF THE INVENTION

The invention relates to a device for adjusting penetration depths of a prescoring saw blade for prescoring the underside of workpiece panels during advance of the carriage of a movable sawing unit, wherein the prescoring saw blade is arranged upon a movable support and wherein the position of the prescoring saw blade changes in response to the motion of a tactile element, moving along a directing surface, which tactile element is associated with the prescoring saw blade.

Panel splitting saws usually comprise a sawing unit which is movable below a table and includes a circular saw blade and a preceding prescoring saw blade. These emerge from the workpiece supporting surface of the panel splitting saw in the direction of advance when the severing cut is being made.

By the prescoring saw blade first penetrating the underside of a workpiece panel along the severing plane at a depth of only a few millimeters during the advancing motion, it is ensured that the actual severing cut made by the circular saw blade cannot cause splintering at the lower edges of the severed surfaces of the workpiece.

If the workpiece panels which are to be split up are rounded off along one or two panel edges extending perpendicularly to the severing plane and parallel to the panel supporting surface, in their upper edge region, and are possibly also laminated (postforming) on their entire upper surface, the prescore groove extending in the workpiece panel must be of special configuration in the region of that rounded-off panel edge which is last severed during a severing cut. In particular, it must be ensured that the panel material in the surface region of this panel edge which is of convex curved cross-section cannot be splintered by the circular saw blade emerging from the panel edge.

This is effectively prevented by the penetration depth of the prescoring saw blade being successively increased in the end phase of the advancing motion in such a way that in relation to the cross-section of this panel edge, the prescore groove emerges from the workpiece panel precisely at the transition point between the rounded-off end face portion and the upper planar panel surface.

To achieve this, a support guided in a vertically displaceable manner in the sawing unit and carrying the prescoring saw blade and its drive has a tactile element which in the end phase of the advancing motion of the sawing unit strikes a stationary directing surface which is of such configuration that the necessary lifting motion of the support and the prescoring blade, respectively, is effected.

Prior to cooperation of the tactile element and the directing surface, i.e., at the beginning of a severing operation, the support is driven out of a lower initial position into a first intermediate position in which the prescoring saw blade penetrates only slightly, for example, at a depth of 1 millimeter, the underside of the workpiece panel in the region of the panel edge which is to be severed first. It is then driven into a second intermediate position which it maintains throughout the greater part of the path of advance and makes a prescore groove at a depth of, for example, 3 to 5 mm before it is finally driven upwardly out of this intermediate position by the directing surface and the tactile element, in the manner described above, in order to sever the other panel edge.

The precision of the cutting motion of the prescoring saw blade achieved in the end phase of the advancing motion by the controlling motion of the support effected by the tactile element sliding along the directing surface has up, to an advancing speed of approximately 50 m/min, so far been sufficient to ensure that the prescore groove emerges from the workpiece panel at the panel edge surface which is rounded off in its upper region, at the point of transition between the rounded-off edge surface portion and the upper planar panel surface.

However, this type of support control does not permit the advancing speed to be substantially increased, for example, to 120 m/min, without the point at which the prescore groove emerges at the top of the workpiece panel simultaneously being displaced. This is due to elasticities and inertias of the masses to be moved when the tactile element strikes the directing surface and also results in a impact effect caused by the parts striking one another, which disadvantageously affects both the cutting quality and the service life of the cooperating parts.

The object underlying the invention is, therefore, to improve a movable sawing unit, having a prescoring saw blade mounted on a vertically movable support and including a tactile element for controlling vertical movement of the support, by providing a device for coordinating the rate of the vertical movement of the support with the rate of advance of the severing saw blade to ensure that the prescoring blade emerges from the top of the trailing edge of the panel being severed, thereby reducing the likelihood of splintering.

This and other objects of the invention will become apparent in light of the present specification, drawings and claims.

SUMMARY OF THE INVENTION

This object is accomplished, in accordance with the invention, by providing, in a movable saw having associated with it a prescoring saw blade, a device for controlling the depth of penetration of the prescoring saw blade comprising a tactile element forming part of a movable support for the prescoring saw; a directing surface along and against which the tactile element is constrained to move for at least a portion of the movable saw's motion, thus causing the movable support to maintain the prescoring saw at a constant cutting position; and an actuating device for causing the movable support for the prescoring saw blade to undergo upward motion jointly with the tactile element, once the tactile element is free from the constraint of the directing surface.

Accordingly, in the device according to the invention, in order to drive the prescoring saw blade upwardly, the tactile element, which is held by the actuating device in constant contact with the directing surface in an intermediate position during forming of the prescore groove, runs off the directing surface, and after the tactile element has been released, the actuating device can drive the support into its upper end position at a certain adjusting speed.

This motion of the support is superimposed on the advancing speed of the sawing unit, and the point in time at which the tactile element runs of the directing surface is selected on the basis of various parameters such as the given advancing speed of the sawing unit and the working speed of the actuating device so that the prescoring saw blade emerges at the desired point on the upper side of the panel.

In the preferred embodiment of the invention, the positioning of the trailing end of the directing surface, relative to the direction of advance of the movable sawing unit, is adjustable and immobilizable. The directing surface, according to one embodiment of the invention, is formed as a rail-type carrier.

The actuating device is, in one embodiment of the invention, a pressure-medium operated cylinder unit, operably associated with the movable support and biased so as to tend to cause said movable support to move toward its upper end position, while maintaining the tactile element in contact with the directing surface.

In a preferred embodiment of the invention, the movable support comprises one end of a rocker, pivotable about a pivot axis, with the tactile element arranged on the other arm thereof.

BRIEF DESCRIPTION OF THE DRAWINGS

FIG. 1 is a cross-section through a workpiece panel together with the prescoring saw blade and the circular saw blade of a sawing unit for making the corresponding severing cut;

FIG. 1a is a section of the cut surface of the workpiece in accordance with FIG. 1, on an enlarged scale;

FIG. 2 is a front view of the sawing unit in a first intermediate position at the beginning of the prescore groove;

FIG. 2a is a section along line 2a—2a of FIG. 2;

DETAILED DESCRIPTION OF THE DRAWINGS

Figure 3:
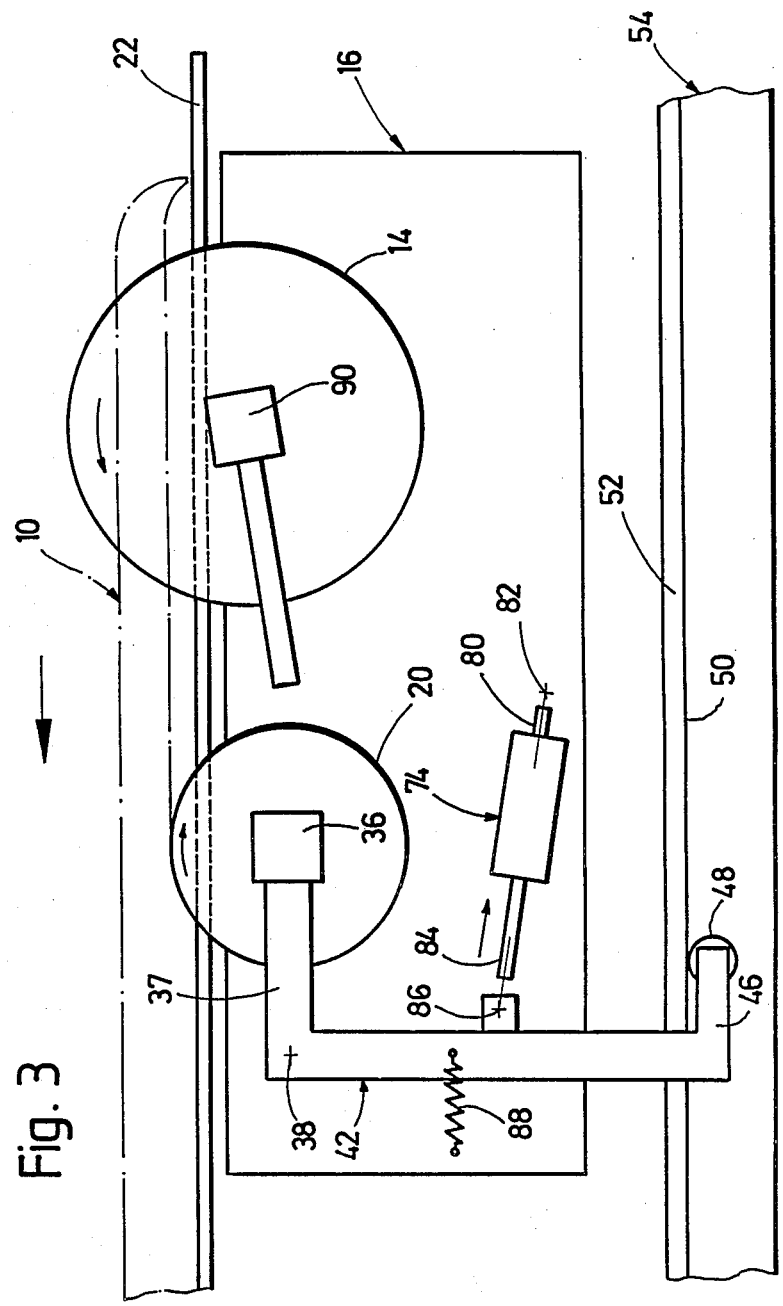
FIG. 3 is an illustration similar to FIG. 2, with the prescoring saw blade in a second intermediate position for making the prescore groove.

While this invention is susceptible of embodiment in many different forms, there is shown in the drawings and will herein be described in detail, a specific preferred embodiment, with the understanding that the present disclosure is to be considered as an exemplification of the principles of the invention and is not intended to limit the invention to the embodiment illustrated.

The following is apparent from the cross-section shown in FIG. 1 of a prescored and severed workpiece panel 10. The actual severing cut (cut surface 12) is preceded by the prescoring which ensures that the cut edges 18 of the severed surfaces on the underside of the panel cannot splinter when the severing cut is made by a circular saw blade 14 of a sawing unit 16 of a panel splitting saw.

A prescoring saw blade 20 for the prescoring precedes the circular saw blade 14 on the sawing unit 16. The prescoring saw blade is drivable (FIG. 4) out of a lower initial position into a first and second intermediate positions and then into an upper end position.

In the lower initial position, it is below the workpiece supporting surface 22 of a workpiece supporting table of the panel splitting saw, but emerges out of the workpiece supporting surface 22 to assume its intermediate position(s) and its upper end position. Similarly, the circular saw blade 14 is, in its position of rest, below the workpiece supporting surface 22 prior to commencement of a sawing operation and emerges upwardly out of it to sever the workpiece panel 10.

At the beginning of a sawing operation, the prescoring saw blade 20 is driven into its first intermediate position shown in FIG. 1 and the circular saw blade 14 into its upper end position. The initial position of the sawing unit 16 in relation to the position of the workpiece panel 10 clamped on the workpiece supporting surface 22 is preferably selected, in particular, in a program controlled manner such that the prescoring saw blade 20 penetrates the underside of the panel (FIG. 1) in the region of the panel edge 24 which is to be severed first. The penetration depth is, for example, 1 mm. The prescoring saw blade 20 is then driven up into its second intermediate position and a prescore groove 26 with a depth of preferably 3 to 5 mm is formed during the advancing motion. The driving up of prescoring saw blade 20 into its second intermediate position is controlled in such a way that the actual prescore groove 24 rises shortly behind the panel edge 24.

If workpiece panel 10 is laminated and its panel edges 24 and 28, which extend perpendicularly to the direction of advance and parallel to the workpiece supporting surface 22, are rounded-off in the upper region, as shown in FIG. 1, in order to prevent splintering of the cut edges 30 of convex curved configuration in the region of the panel edge 28, which is severed last during sawing of the workpiece panel 10, the penetration depth of the prescore groove 26 must be successively altered in the direction towards the upper end position of the prescoring saw blade 20 (FIG. 4) in such a way that it emerges out of the workpiece panel 10 at the point of transition 32 between the rounded-off cut edge 30 and the upper, planar surface 34.

The prescoring saw blade 20 is controlled in such a way that the desired transition point 32 of the prescore groove 26 at the upper panel surface 34 is always exactly maintained at each possible advancing speed.

Figure 5:
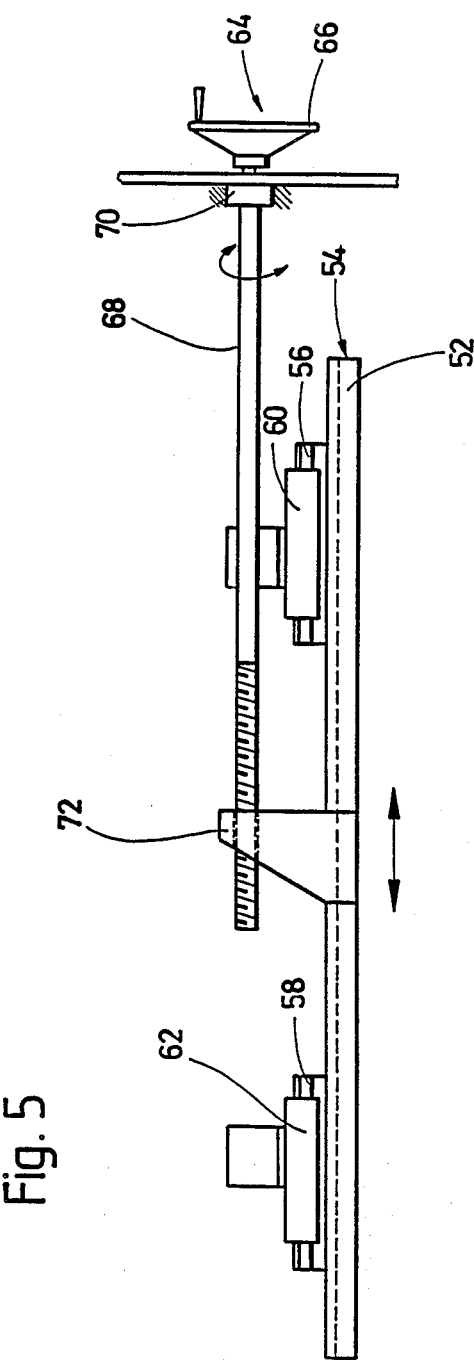
FIG. 5 is a plan view of a rail-type carrier comprising the directing surface and extending in the direction of advance of the sawing unit.

To achieve this, the prescoring saw blade 20, together with its drive motor, not illustrated for reason of simplicity, are mounted on a support 36 which, in turn, rests on a carrying arm 37 of a rocker 42 which is pivotably mounted at 38 on a saw carriage 40. A guide arm 44 extends downwardly from carrying arm 37 and carries at its bottom end, on an angled arm end piece 46, a guide roller as tactile element 48. The directing surface 50 is preferably located on the underside of a horizontal leg 52 of a rail-type carrier 54 which, as shown in FIG. 5, carries on the rear side, for example, two guide elements 56 and 58 which are guided in a displaceable and immobilizable manner on guide devices 60 and 62, respectively.

The carrier 54 is longitudinally adjustable by an adjusting device 64 which, for example, is manually actuatable and to this end has a threaded spindle 68 which is rotatable by a hand wheel 66. On the one hand, the threaded spindle 68 is mounted in a rotatable, but axially immovable manner in a bearing block 70 and, on the other hand, engages an internal thread of an entrainment arm 72 which is attached to the carrier 54.

The rocker 42 is preferably actuated by a pressure-medium-operated cylinder unit 74 forming a so-called tandem cylinder and having two coaxial working pistons 76 and 78. The working piston 76 with a piston rod 80 is articulated at 82 and the working piston 78 with a piston rod 84 at 86 on the guide arm 44.

The maximum stroke of the working piston 76 determines the path of the prescoring saw blade 20, proceeding from its lower initial position, into its first intermediate position (FIG. 2). When the rocker 42 pivots, the working piston 78 remains in its initial position shown in FIG. 2 and the working piston 76 works against a tension spring 88.

As shown in FIG. 2, in the first intermediate position, the tactile element 48 is not in contact with the directing surface 50. When the working piston 78 is then activated in order to drive the prescoring saw blade 20 up into its second intermediate position, this is reached once the tactile element 48 comes to rest against the directing surface 50 along which it then moves over a predetermined distance. During this motion, the prescore groove 26 is formed (FIG. 3) at a depth of, for example, 3 to 5 mm. The emergence of the prescore groove 26 at the transition point 32 on the upper side of the panel is determined by the left end edge 50' of the directing surface 50, in accordance with FIG. 4, and by the given advancing speed.

Figure 4:
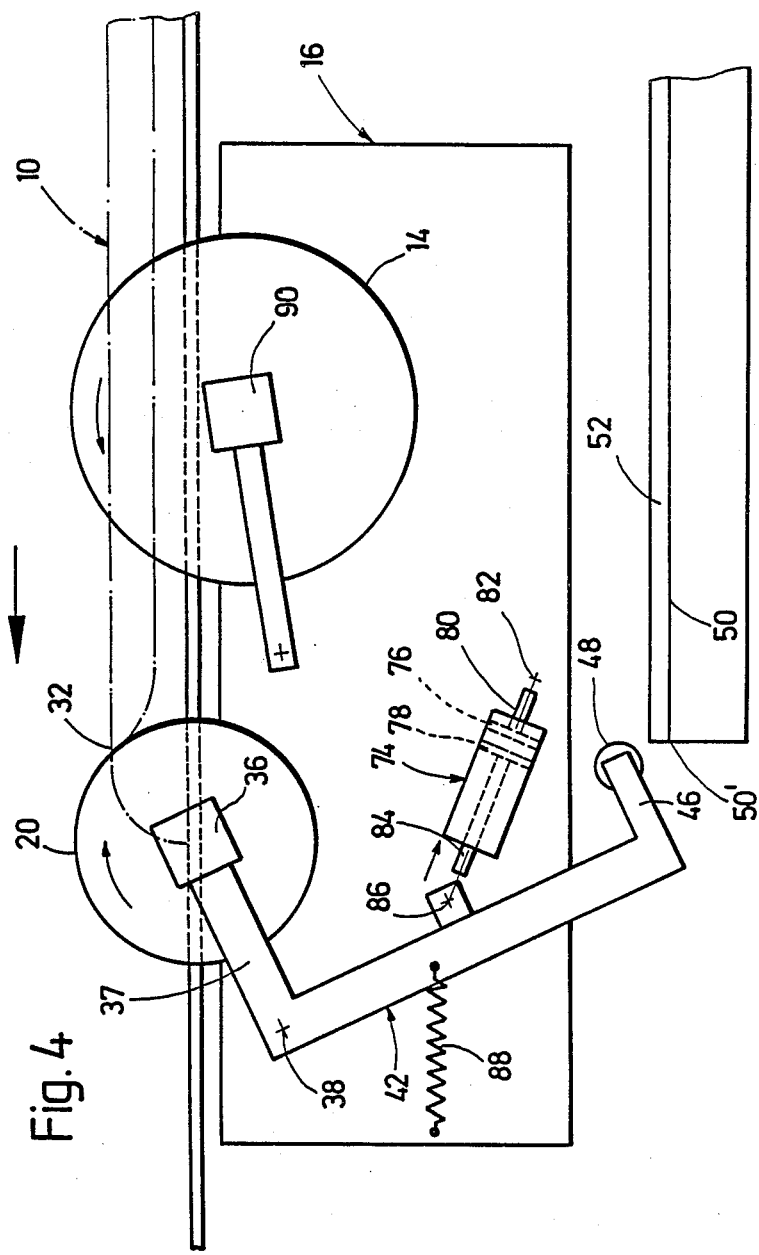
FIG. 4 is an illustration similar to FIG. 3, with the prescoring saw blade in its upper end position.

At the moment at which the roller-type tactile element 48 runs off the directing surface 50, the activated working piston 78 is capable of pivoting the rocker 42 into an end position which corresponds to the upper end position of the prescoring saw blade 20 (FIG. 4) and which is determined by the end position of the working piston 78 in the cylinder unit 74 (FIG. 4).

Accordingly, the position of the transition point 32 of the prescore groove 26 on the upper side 34 of the panel is dependent on several parameters, i.e., on the position of the end edge 50' of the directing surface which is provided for the tactile element 48 to run off of, on the advancing speed and on the working speed of the working piston 78. This position can be empirically determined in a simple way by corresponding longitudinal adjustment of the rail-type carrier 54 by means of the threaded spindle 68 which is rotatable by the hand wheel 66.

As shown in FIGS. 2 to 4, the circular saw blade 14 sits, preferably together with its drive motor, not illustrated, on bearing box 90 which, in turn, is arranged at the front end of a carrying arm 94 pivotably mounted at 92 in the saw carriage 40. The bearing box 90 is upwardly and downwardly pivotable by a suitable actuating device, for example, pneumatically or hydraulically.

The point in time at which the prescoring on the underside of the panel is to begin and the severing cut is to end is preferably determined by a control program. However, control means such as stop-controlled or cam-controlled limit switches or the like can also be used for this purpose. Similarly, the actuating device for driving the prescoring saw blade upwardly may be of different design. In the simplest case, a tension or compression spring with a cam-controlled or magnetically controlled spring catch for its release can be provided.

It will be understood that the directing surface 50 need not extend horizontally. It could also be arranged vertically, in which case, only the mechanical transfer means need to be adapted. What is essential is merely that the horizontally extending section of the prescore groove 26 be interrupted by the tactile element 48 running off the directing surface 50 and that the point at which the prescore groove 26 emerges on the upper side of the panel be determined by the position of the end edge 50' of the directing surface in conjunction with the above-stated parameters.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An apparatus for adjusting penetration depths of a prescoring saw blade for cutting a prescore groove into the under side of workpiece panels during advance of a movable sawing unit, said workpiece panels having at least one panel edge, which extends transversely to the severing plane and, which is rounded-off in the upper region, said apparatus comprising:
   a support for said prescoring saw blade, said support being operably arranged on said movable sawing unit, said support further being vertically movable between upper end and lower initial positions representing, respectively, greater and lesser depths of penetration of said prescoring saw blade;
   a tactile element operably associated with said support so that said support moves in response to movement of said tactile element relative to said movable sawing unit;
   a directing surface operably associated with said movable sawing unit for controlling said movement of said tactile element, and for controlling said vertical movement of said support;
   an actuating device operably associated with said tactile element and said support, said actuating device prompting said support away from said lower initial position toward said upper end position and prompting said tactile element into contact with said directing surface,
   said tactile element being constrained, during a beginning phase of said advance, to move along and against said directing surface, said support simultaneously being placed and held in at least one intermediate position corresponding to a predetermined penetration depth of said prescoring saw blade, and
   said directing surface being configured such that during an end phase of said advance, said tactile element moves beyond and is no longer constrained by said directing surface, enabling said actuating device to drive said support toward said upper end position, simultaneously increasing the penetration depth of the prescoring saw blade so that the prescore groove emerges from the workpiece panel at said rounded-off panel edge, at a transition point between said rounded-off edge and an upper planar surface of said workpiece panel.

2. The apparatus according to claim 1 wherein the directing surface is selectively movable and fixable along the direction of advance of the movable sawing unit.

3. The apparatus according to claim 1 wherein said directing surface is provided on a rail-type carrier.

4. The apparatus according to claim 1 wherein said actuating device further comprises a pressure medium-operated cylinder unit.

5. The apparatus according to claim 4 further including a rocker, pivotable about a pivot axis operably arranged on said movable sawing unit,
   said support being operably arranged upon a first arm of said rocker, and
   said tactile element being operably arranged upon a second arm of said rocker.

* * * * *